Patented July 9, 1935

2,007,765

UNITED STATES PATENT OFFICE 2,007,765

PROCESS OF TREATING FOODS AND PRODUCT THEREOF

Arthur Knudson, Albany, N. Y., assignor, by mesne assignments, to Sun-A-Sured, Inc., a corporation of Delaware No Drawing. Application June 24, 1927, Serial No. 201,282

7 Claims. (Cl. 99—11)

The present invention relates to the modification of alimentary products, such as foods and medicines, with the object of producing therein the antirachitic principle or factor, or, as it is commonly called "vitamin D."

Vitamins possess various properties and are intimately concerned with the normal operation of physiological processes of animals, including man. The antirachitic factor, or "vitamin D" is required for the normal deposition of calcium salts in the bones thus preventing rachitis, or the disease commonly known as rickets. That rickets is a disease common to man and animals to a surprising degree is evident from a survey of published literature.

The exact chemical nature of vitamin D is not fully understood. Recent investigations seem to indicate that ergosterol, an organic chemical substance, is the pro-vitamin of vitamin D and that ergosterol is present in these substances that are activated.

It has been found that edible products such as foods and medicines are rendered antirachitic or their antirachitic power is increased when exposed to the ultra-violet radiations such as are produced by the quartz mercury vapor lamp. This radiation treatment requires a rather considerable time interval, about thirty minutes, which restricts its usefulness.

The present invention has for its object the provision of a process of rendering alimentary products antirachitically active by exposing them to a corpuscular electric discharge, such as the high velocity electrons, also known as cathode rays which are projected from a cathode ray tube. Such exposure requires but a short time interval of the order of a few seconds. It includes also as a new product the substances produced by such treatment.

As an example, ordinary commercial cholesterol, purified simply by recrystallization, may be antirachitically activated by exposure to the action of the cathode rays coming from a high voltage cathode ray tube, such as produced by the cathode ray tube described by Dr. W. D. Coolidge in the Journal of the Franklin Institute, December 19, 1926, Volume 202, pp. 693 to 736 (and in French Patent 603,585). This may be accomplished, for illustration, by placing the cholesterol in a flat shallow dish of about four inches in diameter to a depth of about one or two millimeters and exposing the cholesterol to the cathode rays for a period of ten to thirty seconds or more at a distance of one or two inches from the window of the cathode ray tube and operating the tube at 200,000 volts with a current of about one milliampere. When thus treated, the cholesterol acquires a marked antirachitic action.

Similarly such substances as oils (olive oil, cottonseed, etc.), cereals, yeasts, starch, flour, etc., may be activated.

The length of time of the exposure to the cathode rays may vary, depending upon several factors such as the product being treated, the manner in which it is exposed, the distance of the material from the window of the tube, and the voltage and current at which the tube is operated. In practice the exposure will be regulated to produce the desired effect of imparting the antirachitic principle to the material being treated. These factors can be determined by those familiar with the known methods of testing for the antirachitic principle.

This product of my invention may be used also in increasing the antirachitic principle in feed for chickens, cattle, and other animals. For man, it is of value in increasing the antirachitic factor in such foods as breakfast foods, starch, flour, cereals, fats, and oils. The foods thus treated would be useful as part of infants' or children's diets, likewise in the adult diets, being particularly useful in the diet of pregnant and lactating mothers.

What I claim as new and desire to secure by Letters Patent of the United States is:

1. The process of treating alimentary products which consists in subjecting the same to high velocity electrons for a sufficient length of time only to develop vitamin D therein.

2. The process of developing vitamin D in alimentary substances which consists in exposing thin layers of said substances for about a few seconds to high velocity electrons.

3. The process of treating ergosterol which consists in exposing the ergosterol for a few seconds to high velocity electrons thereby developing vitamin D therein.

4. The process of treating alimentary products which consists in exposing the same to the action of cathode rays for a time sufficient to develop vitamin D therein.

5. The process of treating cereals which consists in subjecting the same to a bombardment of high velocity electrons for a time sufficient to develop vitamin D therein.

6. The process of treating fats which consists in subjecting the same to a bombardment of high velocity electrons for a time sufficient to develop vitamin D therein.

7. The process of treating alimentary products which consists in subjecting the same to a bombardment of high velocity electrons, such as emanate from a cathode ray tube, for a time sufficient only to develop vitamin D therein.

ARTHUR KNUDSON.